United States Patent [19]
Bischof et al.

[11] Patent Number: 5,539,307
[45] Date of Patent: Jul. 23, 1996

[54] CONDUCTOR BAR FOR CONNECTING COIL OF INDUCTIVE SENSOR TO ELECTRIC FEED

[75] Inventors: Rolf Bischof, Fischbach; Gerd-Uwe Weyrich, Wutha-Farnroda, both of Germany

[73] Assignee: Robert Bosch GmbH, Stuttgart, Germany

[21] Appl. No.: 290,858

[22] PCT Filed: Dec. 18, 1993

[86] PCT No.: PCT/DE93/01221

§ 371 Date: Aug. 12, 1994

§ 102(e) Date: Aug. 12, 1994

[87] PCT Pub. No.: WO94/17419

PCT Pub. Date: Aug. 4, 1994

[30] Foreign Application Priority Data

Jan. 22, 1993 [DE] Germany ............................ 43 01 596.4

[51] Int. Cl.[6] .............................. G01P 3/44; G01P 3/488; H01F 27/29; H01R 4/16
[52] U.S. Cl. ...................... 324/173; 174/126.1; 324/174; 324/207.15; 336/192; 439/877
[58] Field of Search ...................................... 324/173, 174, 324/207.15, 207.16, 207.25; 174/52.1, 126.1, 133 R, 133 B; 336/107, 192; 439/111, 739, 877, 878, 888, 889

[56] References Cited

U.S. PATENT DOCUMENTS

| | | | |
|---|---|---|---|
| 1,813,154 | 7/1931 | Franz | 336/107 X R |
| 3,842,302 | 10/1974 | Apostoleris | 439/877 X R |
| 4,596,973 | 6/1986 | Form et al. | 324/174 X R |
| 4,847,557 | 7/1989 | Saito et al. | 324/173 X R |
| 4,888,551 | 12/1989 | Hata et al. | 324/174 X R |
| 5,121,056 | 6/1992 | Onishi et al. | 324/174 X R |
| 5,229,714 | 7/1993 | Brdar et al. | 324/174 X R |
| 5,278,496 | 1/1994 | Dickmeyer et al. | 324/174 |
| 5,363,033 | 11/1994 | Suda et al. | 324/174 X R |

FOREIGN PATENT DOCUMENTS

| | | |
|---|---|---|
| 480844 | 4/1992 | European Pat. Off. . |
| 4106104 | 9/1992 | Germany . |

*Primary Examiner*—Gerard R. Strecker
*Attorney, Agent, or Firm*—Michael J. Striker

[57] ABSTRACT

An inductive sensor (11) with an electric coil (14) cooperates with a revolving, magnetically conducting part to produce electric signals. The ends of the windings of the coil (14) are wound on at one end (21) of a conductor bar (15). A securing bracket (31) is punched out of the conductor bar (15) so that the bent end (21) of the conductor bar can be fastened and the securing bracket (31) also presses on the bent end (21). In this way, the end (21) of the conductor bar is securely fastened and cannot be detached in particular during a change in temperature. This improves the durability of the sensor (11).

6 Claims, 2 Drawing Sheets

CONDUCTOR BAR FOR CONNECTING COIL OF INDUCTIVE SENSOR TO ELECTRIC FEED

BACKGROUND OF THE INVENTION

The present invention relates to a conductor bar. More particularly, it relates to a conductor bar for connecting a coil of an inductive sensor to an electric feed. Particularly in conductor bars used in inductive sensors the winding of the coil is wound on the end of the conductor bar facing the coil. This end is then bent away from the coil and fastened, for instance, in locking projections formed at the housing. The locking projections are made of plastic. Because of the difference in material between the conductor bars and locking projections, fluctuations in temperature give rise to different thermal expansions. While plastics enable a sufficiently secure fastening of the end of the conductor bar, their expansion is not sufficient to enable insertion of the end of the conductor bar without wear on the locking projections.

SUMMARY OF THE INVENTION

Accordingly, it is an object of the present invention to provide a conductor bar of the above mentioned type, which avoids the disadvantages of the prior art.

In keeping with these objects and with others which will become apparent hereinafter, one feature of the present invention resides, briefly stated, in a conductor bar for an inductive sensor for connecting ends of windings of a coil and an electric feed, wherein in accordance with the present invention the conductor bar has a bent end portion which is fastenable to a winding of a coil, and a bracket which rests on the bent end portion.

When the connector bar is designed in accordance with the present invention, it has the advantage over the prior art that it enables a reliable fastening of the conductor bar. Since the same material is used for the conductor bar and fastening, no relative movements can occur due to fluctuations in temperature. The fastening or catch can be incorporated in the conductor bar in a simple manner during production by a punching die. Since the end of the conductor bar is already bent, the retaining bracket can also be bent in the same work step. Further, there is no critical wall thickness in the region of the fastening.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
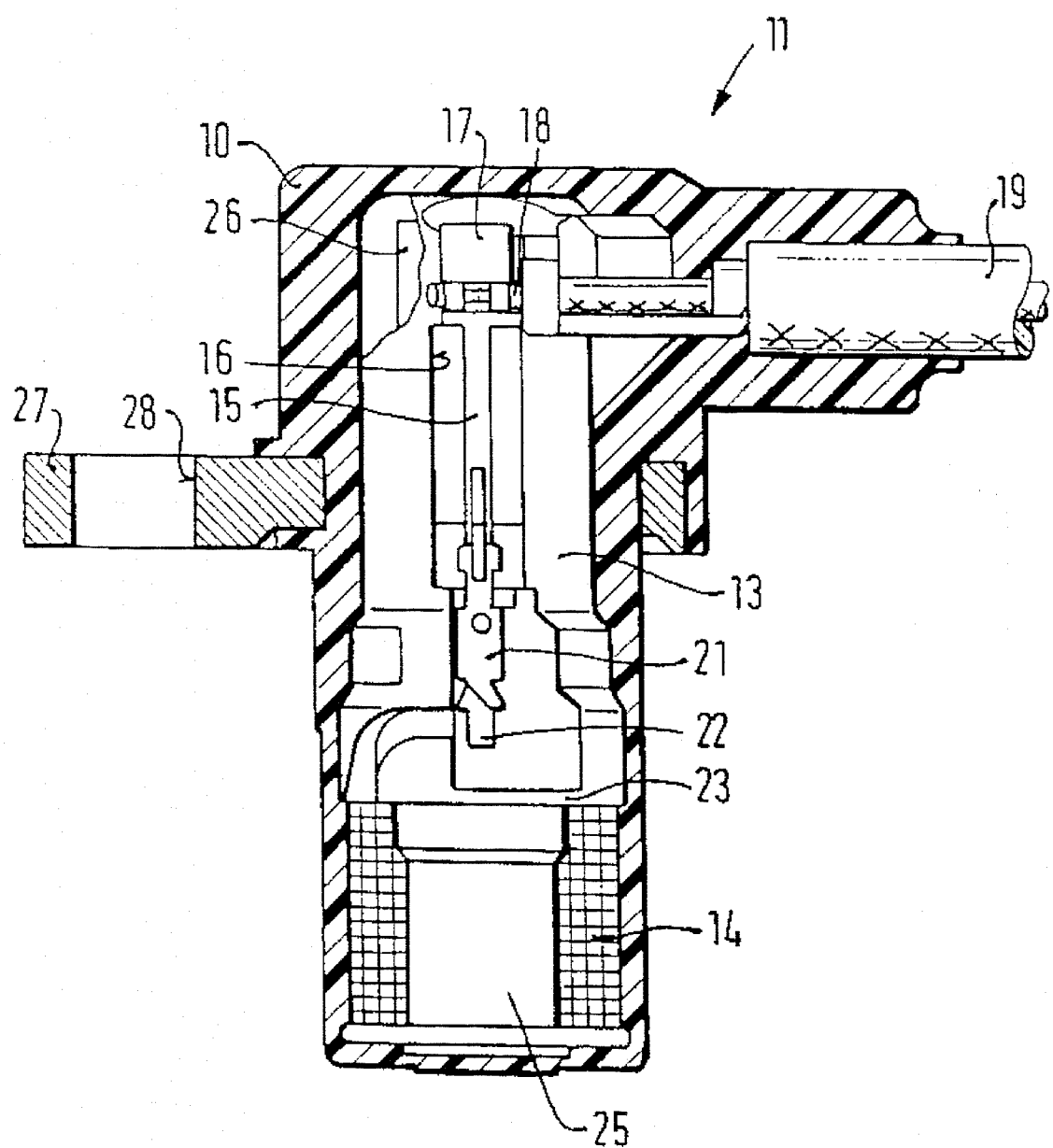
FIG. 1 shows a sensor in cross section with installed conductor bar.

A housing of a speed sensor 11 which is produced by injection molding of magnetically nonconducting injection molding compound is designated by 10 in FIG. 1. An elongated coil body 13 with a coil 14 having a winding is inserted into the housing 10. The winding of the coil 14 is connected to two conductor bars 15 (shown one behind the other in the drawing) which are arranged in longitudinal grooves 16 of the coil body 13. The upwardly projecting free ends 17 of the conductor bars 15 are connected, e.g. welded or soldered, with a conductor 18 of a two-wire connection cable 19 for picking up signals. The end portion 21 of the conductor bars 15 on the coil side is bent and projects away from the coil 14. However, the bend 22 of the conductor bars 15 produced in this way is as near as possible to the coil shield 23 of the coil body 13. By coil shield is meant the two boundaries for the coil 14 formed at the coil body. The respective end, i.e. the beginning or end 14a, of the winding of the coil 14 is fastened to the end portions 21 of the conductor bars 15. A pole pin 25 is arranged in the coil body 13 in the region of the winding. This pole pin 25 is in a working connection with a gear wheel or other rotating part, not shown in the drawing, whose rotating movement is to be determined. It has regions of magnetically conducting material and material with less magnetic conductivity. A permanent magnet 26 is arranged at the end side of the pole pin 25 remote of the rotating part. A fastening bracket 27 of metal is embedded in the housing 10. A bore hole 28 is formed in the fastening bracket 27 for fastening the sensor 11.

Figure 2:
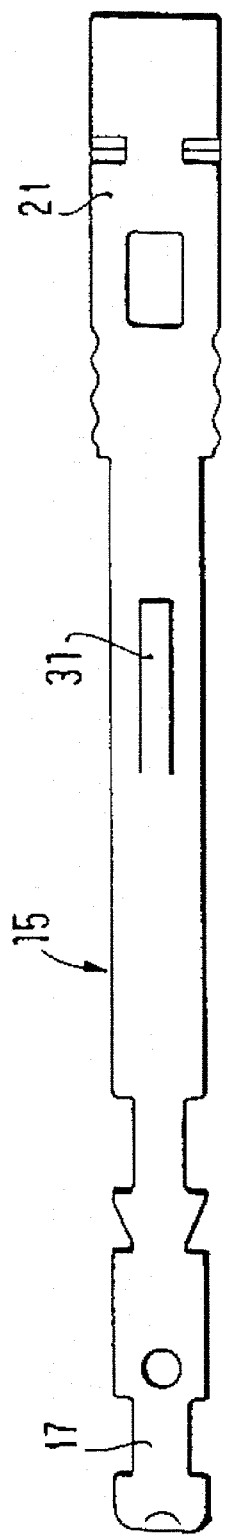
FIG. 2 shows a conductor bar with punched out securing bracket.
Figure 3:
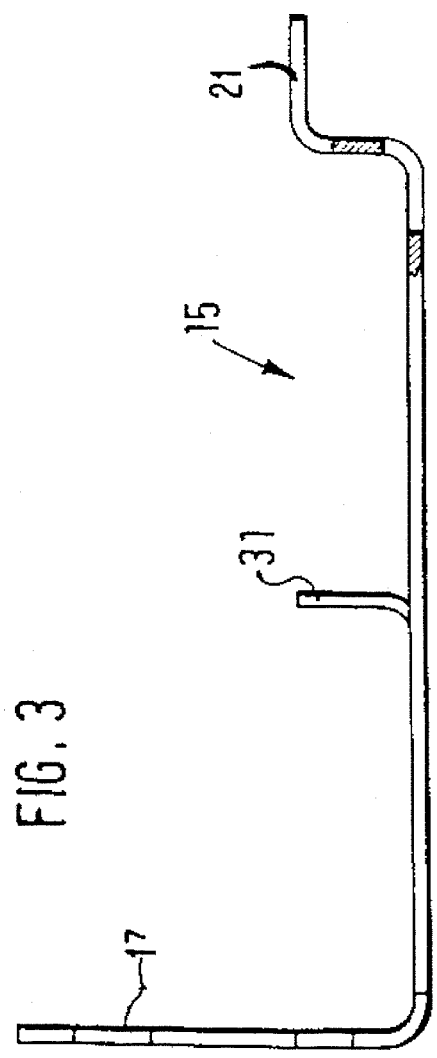
FIG. 3 shows a conductor bar in the process step prior to bending the securing bracket.

According to the invention, a securing bracket 31 is formed in the conductor bar 15. The conductor bar 15 is shown in FIG. 2 in its basic state; the ends of the windings 14a of the coils 14 have not yet been wound on at the end 21. The securing bracket 31 can be produced at the same time by the punching die used to punch the conductor bar 15 out of a base plate. In the further course of the process the securing bracket 31 is bent up as shown in FIG. 3. When the conductor bar 15 is installed in the coil body 13 and the ends 14a of the windings of the coil 14 are wound on at the end 21, this end 21 is bent away from the coil toward the conductor bar 15 until the end 21 rests on the conductor bar 15. The securing bracket 31 is then bent until it contacts the end 21. The region in which the securing bracket 31 is formed is determined by the height at which the end 21 comes into contact again at the conductor bar 15 itself. This must be effected in such a way that the securing bracket 31 at least partially covers the end 21 as shown in FIG. 1. The constructional unit which is preassembled in this way and which includes the coil body 13, conductor bars 15 and coils 14, permanent magnet 26 and pole pin 25 is then inserted into the fastening bracket 27 and placed in an injection molding die. The entire speed sensor is then injection molded with an injection molding compound. It is necessary to fix the end 21 securely by means of the securing bracket 31 in particular because defects which may occur in the injection molded housing 10 cannot be repaired.

The operation of the speed sensor is sufficiently known and therefore need not be discussed at greater length herein. The coil 14 generates a magnetic field which is superimposed on the magnetic field of the permanent magnet 26. When the gear wheel moves past the tip of the pole pin 25, the distance, i.e. the air gap, between the pole pin and gear wheel changes during the movement of the gear wheel due to the teeth and gaps between the teeth. This influences the magnetic field and a measurement signal is accordingly produced.

The use of the conductor bar 15 with the securing bracket 31 is not limited to speed sensors. However, its use is especially advantageous in sensors with an injection molded housing 10.

We claim:

1. A conductor bar for an inductive sensor for connecting one of a winding of a coil to an electric current feeding member, the conductor bar comprising a first end portion connectable to said feeding member, a second end portion which is bent back to rest on said conductor bar and which is fastenable to said one end of said winding of a coil, and a bracket which rests on said bent second end portion to secure the fastening of said bent second end portion to the end of said winding.

2. A conductor bar as defined in claim 1, wherein said conductor bar has a main portion, said bracket is formed as a punched out part of said main portion.

3. An inductive sensor, comprising a coil having a winding with ends; an electric current feeding member; and a conductor bar having a first end portion connectable to the feeding member, a second end portion which is bent back to rest on said conductor bar and which is fastened to said winding of said coil, and a bracket which rests on said bent second end portion to secure the fastening of said bent second end portion to the winding.

4. An inductive sensor as defined in claim 3, wherein said conductor bar has a main portion, said bracket is formed as a punched out part of said main portion.

5. An inductive sensor as defined in claim 3, wherein said bent end portion of said conductor bar is fastened to an end portion of said winding of said coil.

6. An inductive sensor as defined in claim 3, wherein said bent end portion of said conductor bar is fastened to a beginning portion of said winding of said coil.

* * * * *